United States Patent
Li et al.

(10) Patent No.: US 9,829,729 B2
(45) Date of Patent: Nov. 28, 2017

(54) DISPLAY PANEL AND DETECTION METHOD THEREOF

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Ming Li, Beijing (CN); Yong Sub Kim, Beijing (CN); Xiaotao Liu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 193 days.

(21) Appl. No.: 14/407,280

(22) PCT Filed: May 16, 2014

(86) PCT No.: PCT/CN2014/077709
§ 371 (c)(1),
(2) Date: Dec. 11, 2014

(87) PCT Pub. No.: WO2015/058517
PCT Pub. Date: Apr. 30, 2015

(65) Prior Publication Data
US 2016/0282642 A1    Sep. 29, 2016

(30) Foreign Application Priority Data

Oct. 22, 2013 (CN) .......................... 2013 1 0499455

(51) Int. Cl.
*G02F 1/13* (2006.01)
*G02F 1/1343* (2006.01)
(Continued)

(52) U.S. Cl.
CPC ...... *G02F 1/1309* (2013.01); *G02F 1/133514* (2013.01); *G02F 1/133528* (2013.01);
(Continued)

(58) Field of Classification Search
CPC ............. G02F 1/136259; G02F 1/1309; G02F 1/133514
(Continued)

(56) References Cited

U.S. PATENT DOCUMENTS 6,201,590 B1 *  3/2001  Ohta ................. G02F 1/133512
                                                    349/111
8,125,237 B2 *  2/2012  Sellathamby .......... G09G 3/006
                                                    324/760.01
(Continued)

FOREIGN PATENT DOCUMENTS

CN          1702864 A      11/2005
CN          1802685 A      7/2006
(Continued)

OTHER PUBLICATIONS

First Chinese Office Action Appln. No. 201310499455.8; dated Jul. 28, 2015.
(Continued)

*Primary Examiner* — Jermele M Hollington
(74) *Attorney, Agent, or Firm* — Ladas & Parry LLP (57) ABSTRACT

A display panel and a detection method thereof are provided. Wireless signals are transmitted to a gate-line wireless sensing electrode connected to gate lines and a data-line wireless sensing electrode connected to data lines that are preset at a dummy zone of the display panel (1, 1'), respectively, through wireless signal transmitting electrodes (6) connected to a transmitter, so as to generate a gate-line detection signal and a data-line detections signal, thereby realizing detection of the display panel. The gate-line wire- (Continued)

less sensing electrode and the data-line wireless sensing electrode are formed at the dummy zone on the array substrate (1, 1') in the technological process of producing the gate lines and the data lines of the array substrate of the display panel, respectively. Therefore, poorness of a display can be detected without cutting of a display panel (1, 1'), poorness is detected early, and repair is made timely. Thus, the issue that a defective product flows to a subsequent process and a waste of cost results from it is avoided.

20 Claims, 4 Drawing Sheets (51) Int. Cl.
*G02F 1/1362* (2006.01)
*G02F 1/1335* (2006.01)
(52) U.S. Cl.
CPC .. *G02F 1/134309* (2013.01); *G02F 1/136259* (2013.01); *G02F 1/136286* (2013.01); *G02F 2001/136254* (2013.01)
(58) Field of Classification Search
USPC .................................................. 324/760.02
See application file for complete search history.

(56) References Cited

U.S. PATENT DOCUMENTS

| | | | |
|---|---|---|---|
| 2004/0075453 A1 | 4/2004 | Slumpsky | |
| 2004/0174182 A1 | 9/2004 | Toro-Lira et al. | |
| 2005/0174131 A1 | 8/2005 | Miller | |
| 2005/0206404 A1 | 9/2005 | Itagaki | |
| 2007/0026166 A1* | 2/2007 | Gomi | G02F 1/1303 428/1.1 |
| 2007/0138469 A1* | 6/2007 | Yoshimoto | G02F 1/136286 257/59 |
| 2008/0002090 A1 | 1/2008 | Lin et al. | |
| 2009/0201042 A1 | 8/2009 | Sellathamby et al. | |
| 2010/0195039 A1 | 8/2010 | Park | |
| 2013/0100094 A1 | 4/2013 | Shingai et al. | |
| 2013/0120680 A1* | 5/2013 | Sun | G02F 1/1368 349/43 |
| 2013/0265532 A1* | 10/2013 | Kim | G02F 1/133753 349/124 |
| 2015/0323829 A1* | 11/2015 | Huh | G02F 1/133351 445/25 |
| 2016/0018682 A1* | 1/2016 | Kim | G02F 1/1339 349/58 |

FOREIGN PATENT DOCUMENTS

| | | |
|---|---|---|
| CN | 1954227 A | 4/2007 |
| CN | 101114065 A | 1/2008 |
| CN | 101495880 A | 7/2009 |
| CN | 102169094 A | 8/2011 |
| CN | 103487961 A | 1/2014 |

OTHER PUBLICATIONS

International Search Report dated Sep. 12, 2014 and Written Opinion dated Sep. 16, 2014; PCT/CN2014/077709.
International Search Report Appln. No. PCT/CN2014/077709; dated Sep. 12, 2014.

* cited by examiner

DISPLAY PANEL AND DETECTION METHOD THEREOF

TECHNICAL FIELD

Embodiments of the present invention relate to a display panel and a detection method thereof.

BACKGROUND

During manufacture of TFT-LCDs, the occurrence of poorness in display is inevitable. The poorness in liquid crystal display is mainly classified into two categories: a non-electric poorness and an electric poorness. The reason for occurrence of the non-electric poorness is more, and has a relationship with the material and process. Specifically, materials leading to non-electric poorness include liquid crystals, a metal electrode layer (a gate electrode, a source electrode and a drain electrode), an insulating layer, an alignment layer, a sealant and so on. In the event that defects occur in any step in a process for manufacturing the above material layers, a non-electric poorness, such as, a horizontal black line, a white line, a black point, or the like, can be produced. The main reasons for occurrence of an electric poorness are array-process defects, such as, bright lines, bright points, open-circuit of signal lines, and so on.

Figure 1:
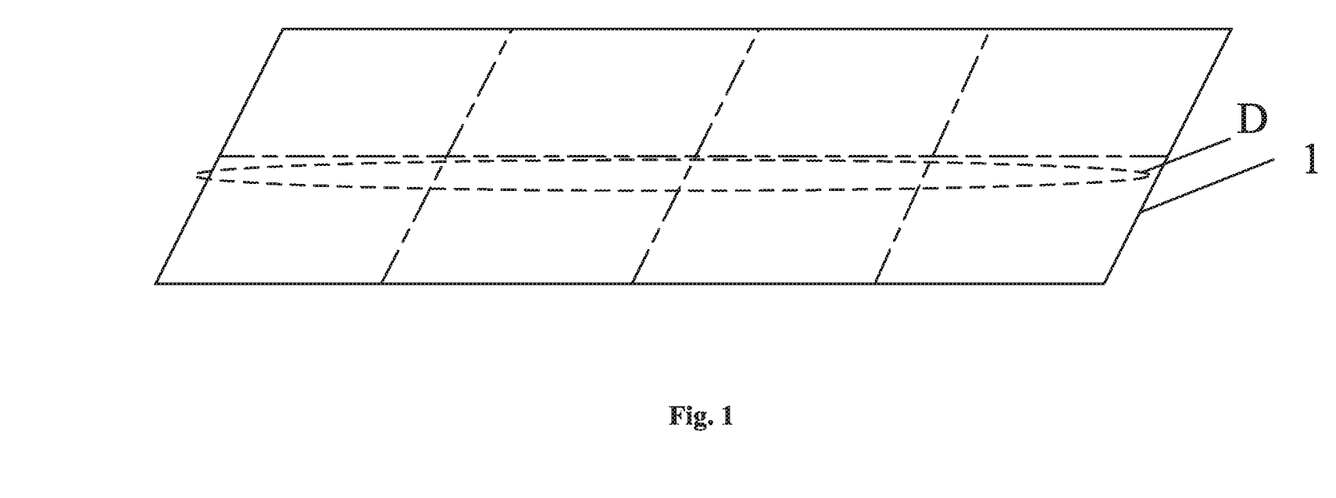
FIG. 1 is a schematic view illustrating a display panel to be cut and a dummy zone thereon.

In order to detect poorness of products quickly and accurately for reflecting the production circumstances, a detection station for a liquid crystal cell is set in a production line of a liquid crystal cell process. An existing detection of liquid crystal cell engineering is placed after a Cell cutting process, and a probe unit in a Cell detection equipment is used for probe test on lead wires (e.g. short-circuit bars) for signal lines (gate lines, data lines, or the like) at a dummy zone (being the portion that has to be discarded upon cutting, namely, a blank space useless for a subsequent module on the panel) of a liquid crystal cell. The probe test includes a turn-on test and a color test on data lines and gate lines of the liquid crystal cell, and it is only aimed at a single liquid crystal cell. A display signal is input to each signal input port of the liquid crystal cell by using a probe unit, so as to detect poorness. However, detection may not be implemented before the liquid crystal cell is cut, such as for a dummy zone denoted by a dashed-line box in FIG. 1, and this is because the probe detection may not be performed on a dummy zone of each liquid crystal cell 1 to be cut by the probe unit in the Cell detection equipment before cutting, namely, the probe cannot touch lead wires for signal lines.

In an existing detection of liquid crystal cell, it is required that only after cell-assembling of a color filter (CF) substrate and a TFT substrate has been finished and a single liquid crystal cell has been formed by cutting a liquid crystal substrate, the detection can be performed. As such, feedback of poorness information is delayed, resulting in a subsequent waste of production cost. Furthermore, the investment cost of a contact-type lighting equipment used for a conventional after-cut detection is extremely high.

SUMMARY

According to one embodiment of the present invention, there is provided a detection method of a display panel, which includes transmitting wireless signals to a gate-line wireless sensing electrode connected to gate lines and a data-line wireless sensing electrode connected to data lines that are preset at a dummy zone of the display panel, respectively, through wireless signal transmitting electrodes connected to a transmitter, so as to generate a gate-line detection signal and a data-line detections signal, thereby realizing detection of the display panel, wherein, the gate-line wireless sensing electrode and the data-line wireless sensing electrode are formed at the dummy zone on an array substrate of the display panel in process of producing the gate lines and the data lines of the array substrate, respectively.

In an example, wireless signals at different frequencies are transmitted by the wireless signal transmitting electrodes to the gate-line wireless sensing electrode and the data-line wireless sensing electrode, respectively.

In an example, the gate-line wireless sensing electrode includes a first gate-line wireless sensing sub-electrode connected to the gate lines in odd-numbered rows and a second gate-line wireless sensing sub-electrode connected to the gate lines in even-numbered rows.

In an example, the data-line wireless sensing electrode includes N data-line wireless sensing sub-electrodes, the data lines for sub-pixels in the same color are connected to the same one of the data-line wireless sensing sub-electrodes, the data lines for sub-pixels in different colors are connected to different ones of the data-line wireless sensing sub-electrodes, and the N is the total number of color of the sub-pixels.

In an example, wireless signals differing in both the frequency and the strength are transmitted by the wireless signal transmitting electrodes to different data-line wireless sensing sub-electrodes, respectively.

In an example, before transmission of wireless signals, it further includes setting the wireless signal transmitting electrodes at locations of a color filter substrate of the display panel in correspondence with the gate-line wireless sensing electrode and the data-line wireless sensing electrode, respectively.

In an example, before transmission of wireless signals, it further includes setting the wireless signal transmitting electrodes at locations of the array substrate of the display panel in correspondence with the gate-line wireless sensing electrode and the data-line wireless sensing electrode, respectively.

In an example, before transmission of wireless signals, it further includes, placing an upper polarizer supported by a first transparent plate on a color filter substrate side of the display panel, placing a lower polarizer supported by a second transparent plate on an array substrate side of the display panel, and setting the wireless signal transmitting electrodes at locations on the second transparent plate in correspondence with the gate-line wireless sensing electrode and the data-line wireless sensing electrode, respectively.

In an example, before transmission of wireless signals, it further includes, placing an upper polarizer supported by a first transparent plate on a color filter substrate side of the display panel, placing a lower polarizer supported by a second transparent plate on an array substrate side of the display panel, and setting the wireless signal transmitting electrodes at locations on the first transparent plate in correspondence with the gate-line wireless sensing electrode and the data-line wireless sensing electrode, respectively.

In an example, before transmission of wireless signals, it further includes, placing a transparent plate on a color filter substrate side of the display panel, and setting the wireless signal transmitting electrodes at locations on the transparent plate in correspondence with the gate-line wireless sensing electrode and the data-line wireless sensing electrode, respectively.

According to another embodiment of the invention, there is provided a display panel, comprising a color filter substrate and an array substrate cell-aligned with each other, wherein, the display panel includes a plurality of display zones and a dummy zone between the plurality of display zones, a gate-line wireless sensing electrode and a data-line wireless sensing electrode are provided within a dummy zone of the array substrate, the gate-line wireless sensing electrode is connected to gate lines on the array substrate, and the data-line wireless sensing electrode is connected to data lines on the array substrate.

In an example, the gate-line wireless sensing electrode and the data-line wireless sensing electrode are of a magnetic material.

In an example, the gate-line wireless sensing electrode and the data-line wireless sensing electrode are configured to transfer wireless electromagnetic signals to electric signals.

In an example, the gate-line wireless sensing electrode includes a first gate-line wireless sensing sub-electrode and a second gate-line wireless sensing sub-electrode, the first gate-line wireless sensing sub-electrode is connected to gate lines in odd-numbered rows, and the second gate-line wireless sensing sub-electrode is connected gate lines in even-numbered rows.

In an example, the data-line wireless sensing electrode includes a plurality of data-line wireless sensing sub-electrodes, and each of the data-line wireless sensing sub-electrodes is connected to data lines for driving sub-pixels in different colors, respectively.

In the detection method of the display panel provided by embodiments of the invention, wireless sensing electrodes are formed by means of injecting a wireless inductive material connected to gate lines and data lines within a dummy zone of each liquid crystal cell to be cut when an array-substrate process is carried on, and the wireless inductive material can absorb wireless signals and convert them into voltage signals. As such, after the whole panel is formed, without cutting, by adopting a wireless means directly, a corresponding wireless signal is applied to each of the wireless sensing electrodes, so as to charge gate lines and data lines. Detection of an electric poorness and a non-electric poorness of the display can be realized by observing the phenomenon on the display panel. According to the invention, before a liquid crystal cell is cut, poorness can be detected earlier, so that a defective problem can be handled at an early date. This avoids a waste of cost resulting from the poorness flowing to a subsequent process.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

In embodiments, descriptions will be given with reference to an example in which a liquid crystal display panel is detected, and what is detected usually is a liquid crystal cell after cell-assembling of an array substrate and a color filter substrate. In a detection method according to the embodiment, a wireless inductive power-up way is adopted for realizing detection of a liquid crystal cell. A detecting mode according to an embodiment is as follows.

Wireless signals are transmitted to a gate-line wireless sensing electrode connected to a gate line and a data-line wireless sensing electrode connected to a data line, which are preset at a dummy zone D of the liquid crystal cell, so as to generate a gate-line detection signal and a data-line detection signal, respectively. Thus, detection of the liquid crystal cell is achieved. In the embodiment, the gate-line wireless sensing electrode and the data-line wireless sensing electrode are formed at a dummy zone D on an array substrate in the technological process of manufacturing gate lines and data lines of the array substrate of the liquid crystal cell, respectively.

A wireless sensing electrode and a wireless signal transmitting electrode are each a magnetic material, which is similar to a ferrite wave absorbing material. The wireless signal transmitting electrode acts to transmit a magnetic signal to the wireless sensing electrode, and the wireless sensing electrode is capable of transferring the wireless magnetic signal into an electric signal by utilizing the electromagnetic induction technology, so as to produce a corresponding voltage. In order to avoid interference between wireless signals for the gate lines and data lines, wireless signals at different frequencies are transmitted to the gate-line wireless sensing electrode and the data-line wireless sensing electrode, respectively.

Figure 2:
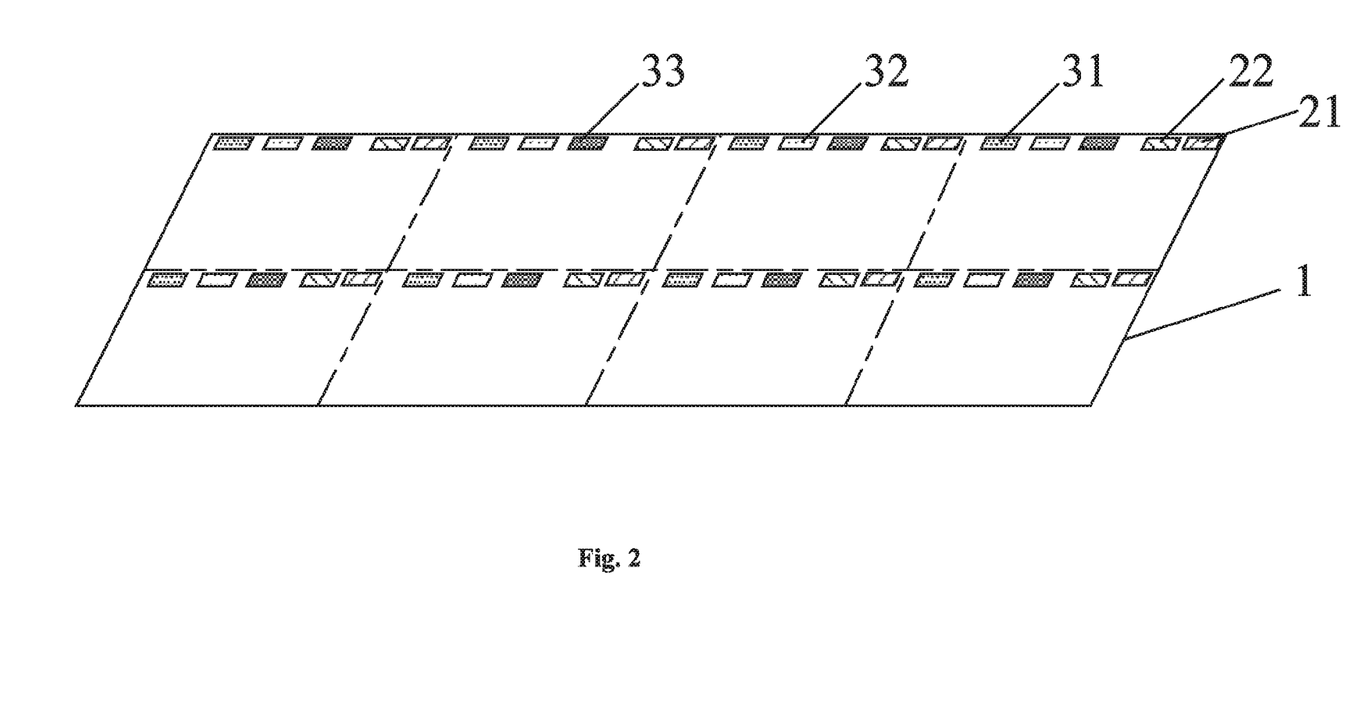
FIG. 2 is a schematic view illustrating a display panel adopted in a detection method of a display panel according to an embodiment of the invention.

As illustrated in FIG. 2, which is a schematic view illustrating arrangement of wireless sensing electrodes that are used in a detection method of a display panel according to an embodiment of the invention, within a dummy zone of a liquid crystal cell 1 to be cut, there is preset a gate-line wireless sensing electrode, which includes a first gate-line wireless sensing sub-electrode 21 connected to gate lines in odd-numbered rows and a second gate-line wireless sensing sub-electrode 22 connected to gate lines in even-numbered rows. Upon detection, wireless signals are transmitted to the first gate-line wireless sensing sub-electrode 21 and the second gate-line wireless sensing sub-electrode 22 at an interval.

Further, in order that different colors can be displayed upon detection, the data-line wireless sensing electrode includes N data-line wireless sensing sub-electrodes, each of which is connected to data lines for driving sub-pixels in the same color. Different data-line wireless sensing sub-electrodes are connected to data lines for driving sub-pixels in different colors, and the N is the total number of color of sub-pixels. In general, liquid crystal cells adopt a color mode of RGB, namely, N is 3. For example, in FIG. 2, the data-line wireless sensing electrode includes three data-line wireless sensing sub-electrodes: a first data-line wireless sensing sub-electrode 31, a second data-line wireless sensing sub-electrode 32 and a third data-line wireless sensing sub-electrode 33. The first data-line wireless sensing sub-electrode 31, the second data-line wireless sensing sub-electrode 32 and the third data-line wireless sensing sub-electrode 33 may be connected to red, green and blue sub-pixels, respectively. Upon detection, wireless signals at different frequencies (for avoiding signal interference) and with different strengths are transmitted to the first data-line wireless sensing sub-electrode 31, the second data-line wireless sensing sub-electrode 32 and the third data-line wireless sensing sub-electrode 33, respectively, so as to generate different voltages.

Of course, the number and arrangement of the gate-line wireless sensing electrode and the data-line wireless sensing electrode are not limited to this, as long as they can sense wireless signals, respectively, and convert the wireless signals into electric signals for application to gate lines and data lines. For example, the gate-line wireless sensing electrode may have only one gate-line wireless sensing sub-electrode (connected to all the gate lines) as well, and the data-line wireless sensing electrode has only one data-line wireless sensing sub-electrode (connected to all the data lines); or, the data-line wireless sensing electrode includes M (which is the number of data lines) data-line wireless sensing sub-electrodes, each data line is connected to a different one of the data-line wireless sensing sub-electrodes.

Figure 3:
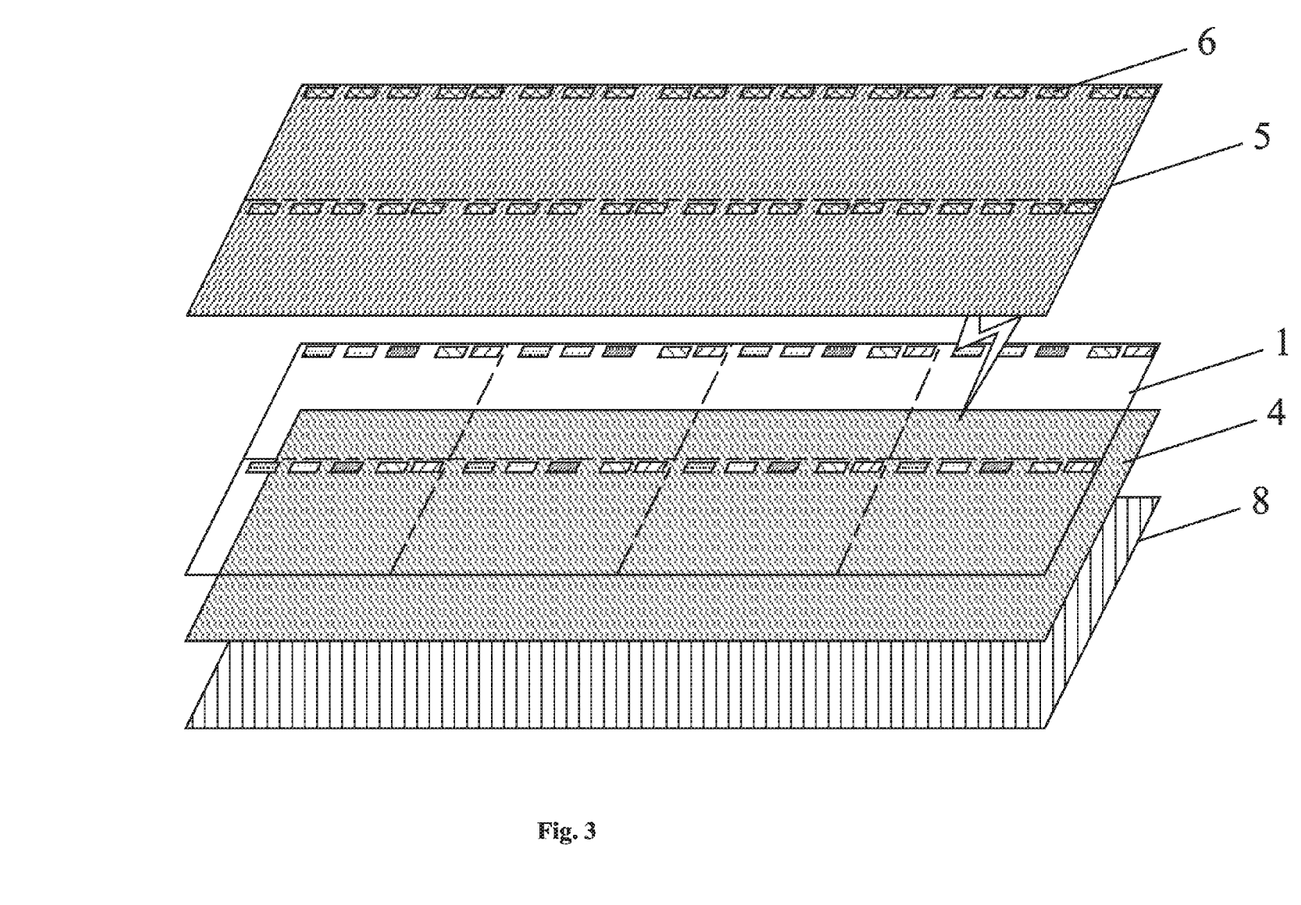
FIG. 3 is a schematic view illustrating detection of a liquid crystal display panel by a detection method of a display panel according to an embodiment of the invention.

As regards detection of liquid crystal cells, as illustrated in FIG. 3, a backlight source 8 is disposed below a liquid crystal cell 1, a lower polarizer is further disposed above the backlight source 8, and an upper polarizer is disposed above the liquid crystal cell, so that the effects of display can be observed. The upper polarizer is placed on a first transparent plate 5, and the lower polarizer is placed on a second transparent plate 4. Owing to a pipeline operation, each liquid crystal cell 1 that has not been cut is transported so as to lie between the first transparent plate 5 and the second transparent plate 4 for detection.

In the above embodiment, transparent plates 4 and 5 for supporting the polarizers are disposed on upper and lower sides of the liquid crystal cell, respectively. However, in other embodiment according to the invention, transparent plates 4 and 5 for supporting polarizers may be disposed on surfaces of an array substrate and a color filter substrate that face a liquid crystal layer, respectively.

It is also necessary that wireless signal transmitting electrodes 6 be set at a suitable location before transmission of wireless signals, and theoretically, the wireless signal transmitting electrodes 6 may be set at any location where wireless signals can be transmitted to the gate-line wireless sensing electrode and the data-line wireless sensing electrode. For the sake of illustrative convenience, with respect to a liquid crystal cell formed by cell-assembling of a color filter substrate and an array substrate, one side where the color filter substrate is located is defined as an observing side. In the embodiment, in order to avoid supporting the wireless signal transmitting electrode 6 with a separate holder, wireless signal transmitting electrodes 6 may be set at locations corresponding to the gate-line wireless sensing electrode and the data-line wireless sensing electrode on a surface of the color filter substrate of the liquid crystal cell 1 facing the observing side, respectively (for example, the wireless sensing electrodes and the wireless signal transmitting electrodes are opposite to each other); wireless signal transmitting electrodes 6 may also be set at locations corresponding to the gate-line wireless sensing electrode and the data-line wireless sensing electrode on a surface of the array substrate facing away from the observing side, respectively (for example, the wireless sensing electrodes and the wireless signal transmitting electrodes are opposite to each other); wireless signal transmitting electrodes 6 may also be set at locations corresponding to the gate-line wireless sensing electrode and the data-line wireless sensing electrode on the second transparent plate 4, respectively; and it is also possible that, as illustrated in FIG. 3, wireless signal transmitting electrodes 6 are set at locations of the first transparent plate 5 in correspondence with a dummy zone of the liquid crystal cell 1, i.e., at locations corresponding to (e.g. in opposition to) the gate-line wireless sensing electrode and the data-line wireless sensing electrode. A transmitter connected to the wireless signal transmitting electrodes 6 is turned on, so as to transmit wireless signals to the wireless sensing electrodes. The wireless signal transmitting electrodes 6 may be connected to the transmitter through wires, but the wires are usually opaque, and are inconvenient for observation during detection. Optionally, it is possible that for the sake of facilitating connection to the transmitter, a number of transparent lead electrodes are formed at a dummy zone of a substrate supporting the wireless signal transmitting electrodes 6, so that each of the transparent lead electrodes is connected to one of the wireless signal transmitting electrodes 6 at one end of it, and connected to a different one of the wireless signal transmitting electrodes 6, and its other end is connected to an edge of the substrate supporting the wireless signal transmitting electrodes 6 so as to be connected to the transmitter conveniently.

Although the wireless signal transmitting electrodes are formed on a surface of the color filter substrate facing the observing side in the above embodiment, in other embodiment according to the invention, it is also possible that wireless signal transmitting electrodes are formed on a surface of the color filter substrate at an inner side (namely, a surface facing the liquid crystal layer). Likewise, wireless signal transmitting electrode may also be formed on a surface of the array substrate at an inner side (namely, a surface facing the liquid crystal layer).

The detection method according to the embodiment differs from the prior art in the power-up mode, and in addition to this, for example, other detecting steps may be similar to those in prior art (such as, the method by which the type of poorness is judged based on diverse display effects is the same as that in prior art), details being omitted here.

With the detection method according to the embodiment, detection can be realized without cutting of the liquid crystal cell, so that problems are detected early, and repair is made timely. Thus, the issue that a defective product flows to a subsequent process and a waste of cost results from it is avoided.

Figure 4:
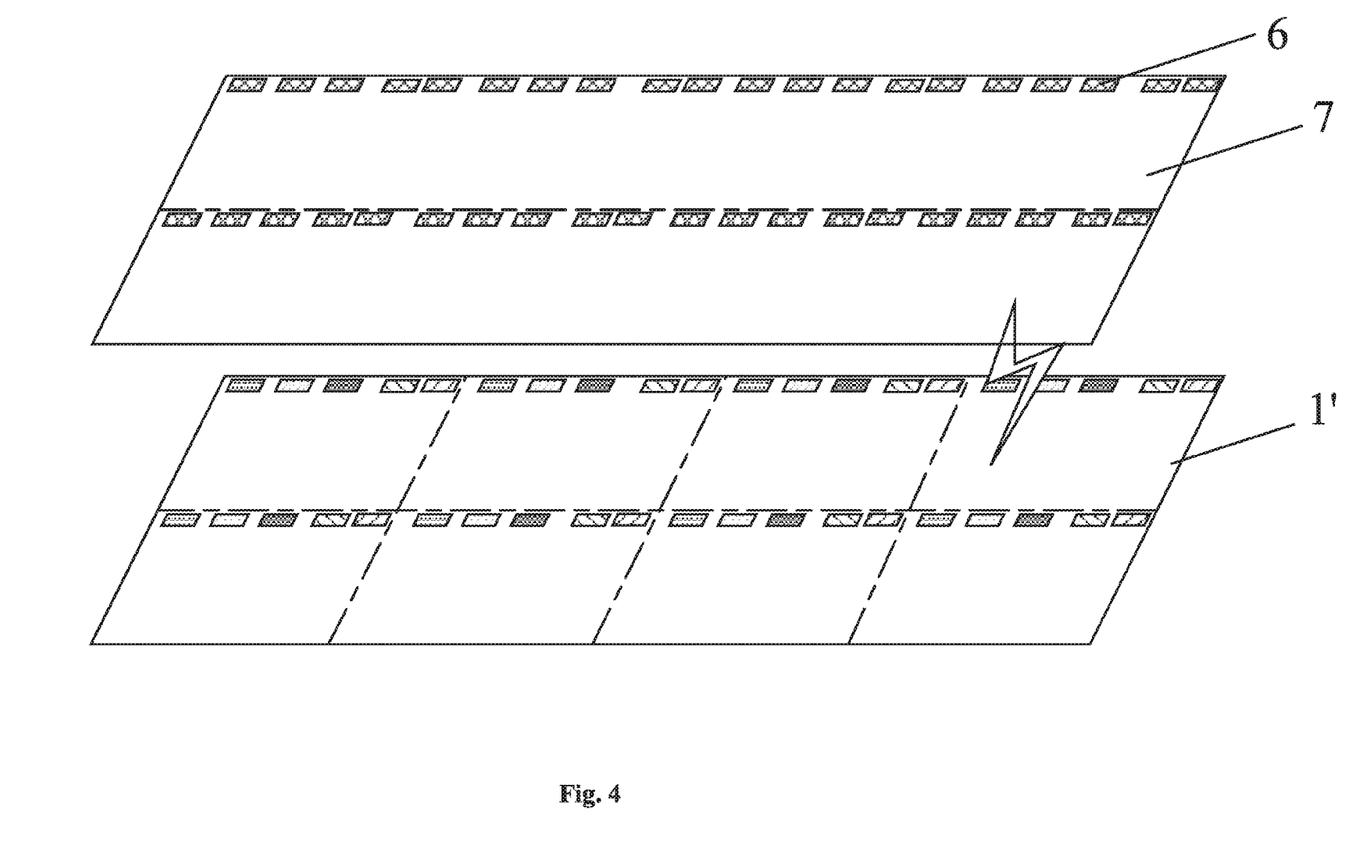
FIG. 4 is a schematic view illustrating detection of an OLED display panel by a detection method of a display panel according to an embodiment of the invention.

The detection method of the display panel according to the invention is not only applicable to liquid crystal cells, but also applicable for detection of OLED display panels. As illustrated in FIG. 4. as an OLED display panel 1' does not need a backlight source, and does not need a polarizer, either, a transparent plate 7 (serving as a holder for supporting wireless signal transmitting electrodes 6) is placed above or below the OLED display panel 1', and wireless signal transmitting electrodes 6 in correspondence with a gate-line wireless sensing electrode and a data-line wireless sensing electrode are disposed at a location of the transparent plate 7 corresponding to a dummy zone.

According to an embodiment of the invention, there is further provided a display panel including a color filter substrate and an array substrate cell-aligned with each other, wherein, the display panel includes a plurality of display zones and a dummy zone between the plurality of display zones, a gate-line wireless sensing electrode and a data-line wireless sensing electrode are provided within a dummy zone of the array substrate, the gate-line wireless sensing electrode is connected to gate lines on the array substrate, and the data-line wireless sensing electrode is connected to data lines on the array substrate.

The gate-line wireless sensing electrode and the data-line wireless sensing electrode are of a magnetic material. For example, the gate-line wireless sensing electrode and the data-line wireless sensing electrode are configured to transfer wireless electromagnetic signals to electric signals.

For example, the gate-line wireless sensing electrode includes a first gate-line wireless sensing sub-electrode and a second gate-line wireless sensing sub-electrode, the first gate-line wireless sensing sub-electrode is connected to gate lines in odd-numbered rows, and the second gate-line wireless sensing sub-electrode is connected gate lines in even-numbered rows.

For example, the data-line wireless sensing electrode includes a plurality of data-line wireless sensing sub-electrodes, and each of the data-line wireless sensing sub-electrodes is connected to data lines for driving sub-pixels in different colors.

Descriptions made above are merely exemplary embodiments of the invention, but are not used to limit the protection scope of the invention. The protection scope of the invention is determined by the attached claims.

This application claims the benefit of priority from Chinese patent application No. 201310499455.8, filed on Oct. 22, 2013, the disclosure of which is incorporated herein in its entirety by reference as a part of the present application.

The invention claimed is:

1. A detection method of a display panel comprising a plurality of display zones and a dummy zone between the plurality of display zones, comprising:
   wireless signal transmitting electrodes, connected to a transmitter, transmitting wireless signals to a gate-line wireless sensing electrode connected to gate lines and a data-line wireless sensing electrode connected to data lines, so as to generate a gate-line detection signal and a data-line detection signal, wherein, the gate-line wireless sensing electrode and the data-line wireless sensing electrode are located at a dummy zone of the display panel which is to be discarded by cutting the display panel to separate the display zones,
   wherein, the gate-line wireless sensing electrode and the data-line wireless sensing electrode are formed at the dummy zone on an array substrate of the display panel in process of producing the gate lines and the data lines of the array substrate, respectively.

2. The detection method of the display panel according to claim 1, wherein, wireless signals at different frequencies are transmitted by the wireless signal transmitting electrodes to the gate-line wireless sensing electrode and the data-line wireless sensing electrode, respectively.

3. The detection method of the display panel according to claim 1, wherein, the gate-line wireless sensing electrode includes a first gate-line wireless sensing sub-electrode connected to the gate lines in odd-numbered rows and a second gate-line wireless sensing sub-electrode connected to the gate lines in even-numbered rows.

4. The detection method of the display panel according to claim 1, wherein, the data-line wireless sensing electrode includes N data-line wireless sensing sub-electrodes, the data lines for sub-pixels in the same color are connected to the same one of the data-line wireless sensing sub-electrodes, the data lines for sub-pixels in different colors are connected to different ones of the data-line wireless sensing sub-electrodes, and the N is the total number of color of the sub-pixels.

5. The detection method of the display panel according to claim 1, wherein, wireless signals differing in both the frequency and the strength are transmitted by the wireless signal transmitting electrodes to different data-line wireless sensing sub-electrodes, respectively.

6. The detection method of the display panel according to claim 1, wherein, before transmission of wireless signals, the method further includes setting the wireless signal transmitting electrodes at locations of a color filter substrate of the display panel in correspondence with the gate-line wireless sensing electrode and the data-line wireless sensing electrode, respectively.

7. The detection method of the display panel according to claim 1, wherein, before transmission of wireless signals, the method further includes setting the wireless signal transmitting electrodes at locations of the array substrate of the display panel in correspondence with the gate-line wireless sensing electrode and the data-line wireless sensing electrode.

8. The detection method of the display panel according to claim 1, wherein, before transmission of wireless signals, the method further includes, placing an upper polarizer supported by a first transparent plate on a color filter substrate side of the display panel, placing a lower polarizer supported by a second transparent plate on an array substrate side of the display panel, and setting the wireless signal transmitting electrodes at locations on the second transparent plate in correspondence with the gate-line wireless sensing electrode and the data-line wireless sensing electrode, respectively.

9. The detection method of the display panel according to claim 1, wherein, before transmission of wireless signals, the method further includes, placing an upper polarizer supported by a first transparent plate on a color filter substrate side of the display panel, placing a lower polarizer supported by a second transparent plate on an array substrate side of the display panel, and setting the wireless signal transmitting electrodes at locations on the first transparent plate in correspondence with the gate-line wireless sensing electrode and the data-line wireless sensing electrode, respectively.

10. The detection method of the display panel according to claim 1, wherein, before transmission of wireless signals, the method further includes, placing a transparent plate on a color filter substrate side of the display panel, and setting the wireless signal transmitting electrodes at locations on the transparent plate in correspondence with the gate-line wireless sensing electrode and the data-line wireless sensing electrode, respectively.

11. A display panel, comprising a color filter substrate and an array substrate cell-assembled with each other, wherein,
   the display panel includes a plurality of display zones and a dummy zone between the plurality of display zones,
   a gate-line wireless sensing electrode and a data-line wireless sensing electrode are provided within the dummy zone of the array substrate, the gate-line wireless sensing electrode is connected to gate lines on the array substrate, and the data-line wireless sensing electrode is connected to data lines on the array substrate, wherein, the dummy zone of the display panel is to be discarded by cutting the display panel to separate the display zones.

12. The display panel according to claim 11, wherein, the gate-line wireless sensing electrode and the data-line wireless sensing electrode are of a magnetic material.

13. The display panel according to claim 12, wherein, the gate-line wireless sensing electrode and the data-line wireless sensing electrode are configured to transfer wireless electromagnetic signals to electric signals.

14. The display panel according to claim 11, wherein, the gate-line wireless sensing electrode includes a first gate-line wireless sensing sub-electrode and a second gate-line wireless sensing sub-electrode, the first gate-line wireless sensing sub-electrode is connected to gate lines in odd-numbered rows, and the second gate-line wireless sensing sub-electrode is connected gate lines in even-numbered rows.

15. The display panel according to claim 11, wherein, the data-line wireless sensing electrode includes a plurality of data-line wireless sensing sub-electrodes, and each of the data-line wireless sensing sub-electrodes is connected to data lines for driving sub-pixels in different colors, respectively.

16. The detection method of the display panel according to claim 2, wherein, the gate-line wireless sensing electrode includes a first gate-line wireless sensing sub-electrode connected to the gate lines in odd-numbered rows and a second gate-line wireless sensing sub-electrode connected to the gate lines in even-numbered rows.

17. The detection method of the display panel according to claim 2, wherein, the data-line wireless sensing electrode includes N data-line wireless sensing sub-electrodes, the data lines for sub-pixels in the same color are connected to the same one of the data-line wireless sensing sub-electrodes, the data lines for sub-pixels in different colors are connected to different ones of the data-line wireless sensing sub-electrodes, and the N is the total number of color of the sub-pixels.

18. The detection method of the display panel according to claim 2, wherein, wireless signals differing in both the frequency and the strength are transmitted by the wireless signal transmitting electrodes to different data-line wireless sensing sub-electrodes.

19. The detection method of the display panel according to claim 2, wherein, before transmission of wireless signals, the method further includes setting the wireless signal transmitting electrodes at locations of a color filter substrate of the display panel in correspondence with the gate-line wireless sensing electrode and the data-line wireless sensing electrode, respectively.

20. The detection method of the display panel according to claim 1, wherein, the gate-line wireless sensing electrode and the data-line wireless sensing electrode are of a magnetic material.

* * * * *